US011001114B2

(12) United States Patent
Berlingieri et al.

(10) Patent No.: US 11,001,114 B2
(45) Date of Patent: May 11, 2021

(54) VARIABLE RATE FLAT SPRING ARRANGEMENT

(71) Applicant: RASSINI SUSPENSIONES, S.A. DE C.V., Del. Miguel Hidalgo (MX)

(72) Inventors: Anthony Berlingieri, Plymouth, MI (US); Brian R. Brothers, Lake Orion, MI (US); Jose G. Delgado, Coahuila (MX); Ramon Heberto Diego Guedea, Ann Arbor, MI (US); Robert W. Friedrichs, South Lyon, MI (US); Chris Galea, Monroe, MI (US); Jeffrey S. Hopkins, Livonia, MI (US); Ananth K. Kota, Troy, MI (US); Jesus Ernesto Meza, Coahuila (MX); Jose Roberto Frausto Rodriguez, Coahuila (MX); Jose G. Ruiz Juarez, Coahuila (MX); Ronald J. Willemsen, Macomb, MI (US); James N. Zeimet, Commerce Twp., MI (US)

(73) Assignee: Rassini Suspensiones, S.A. de C.V.

( * ) Notice: Subject to any disclaimer, the term of this patent is extended or adjusted under 35 U.S.C. 154(b) by 0 days.

(21) Appl. No.: 15/574,031

(22) PCT Filed: May 12, 2016

(86) PCT No.: PCT/US2016/032106
§ 371 (c)(1),
(2) Date: Nov. 14, 2017

(87) PCT Pub. No.: WO2016/183323
PCT Pub. Date: Nov. 17, 2016

(65) Prior Publication Data
US 2018/0297430 A1 Oct. 18, 2018

Related U.S. Application Data

(60) Provisional application No. 62/161,511, filed on May 14, 2015.

(51) Int. Cl.
*B60G 3/10* (2006.01)
*B60G 11/107* (2006.01)
(Continued)

(52) U.S. Cl.
CPC .............. *B60G 11/107* (2013.01); *B60G 9/02* (2013.01); *B60G 11/02* (2013.01); *B60G 11/04* (2013.01);
(Continued)

(58) Field of Classification Search
CPC ......... B60G 11/04; B60G 11/02; B60G 11/10; B60G 9/02; B60G 17/023; B60G 11/107;
(Continued)

(56) References Cited

U.S. PATENT DOCUMENTS

| 1,384,146 | A | * | 7/1921 | Montgomery | ......... | B60G 21/04 |
| | | | | | | 267/40 |
| 4,570,971 | A | * | 2/1986 | Perlini | ..................... | B60G 5/06 |
| | | | | | | 280/680 |

(Continued)

OTHER PUBLICATIONS

International Search Report regarding related PCT App. No. PCT/US2016/032106; dated Aug. 24, 2016; 4 pgs.
(Continued)

*Primary Examiner* — Toan C To
(74) *Attorney, Agent, or Firm* — Dickinson Wright PLLC

(57) ABSTRACT

A suspension system for a vehicle includes a first chassis rail and a second chassis rail, each extending longitudinally in an axial direction of the vehicle. Also included is a first leaf spring element extending longitudinally in the axial direction of the vehicle, the first leaf spring element operatively coupled proximate ends thereof to the first chassis rail and at an intermediate location to an axle assembly of the vehicle. Further included is a second leaf spring element extending longitudinally in the axial direction of the vehicle,
(Continued)

the second leaf spring element operatively coupled proximate ends thereof to the second chassis rail and at an intermediate location to the axle assembly of the vehicle. Yet further included is at least one leaf spring extending in a transverse direction of the vehicle, the at least one leaf spring having a spring rate that is actively variable.

7 Claims, 11 Drawing Sheets

(51) Int. Cl.

| | | |
|---|---|---|
| *F16F 1/22* | (2006.01) | |
| *F16F 3/02* | (2006.01) | |
| *B60G 11/04* | (2006.01) | |
| *B60G 11/08* | (2006.01) | |
| *B60G 11/10* | (2006.01) | |
| *B60G 11/02* | (2006.01) | |
| *F16H 25/20* | (2006.01) | |
| *B60G 9/02* | (2006.01) | |
| *B60G 17/02* | (2006.01) | |

(52) U.S. Cl.
CPC ............. *B60G 11/08* (2013.01); *B60G 11/10* (2013.01); *B60G 17/023* (2013.01); *F16F 1/22* (2013.01); *F16F 3/023* (2013.01); *F16H 25/20* (2013.01); *B60G 2200/326* (2013.01); *B60G 2202/11* (2013.01); *B60G 2202/112* (2013.01); *B60G 2202/114* (2013.01); *B60G 2204/121* (2013.01); *B60G 2206/428* (2013.01); *B60G 2500/20* (2013.01); *B60G 2800/162* (2013.01); *F16F 2228/066* (2013.01)

(58) Field of Classification Search
CPC ............... B60G 11/08; B60G 2202/11; B60G 2202/112; B60G 2202/114; B60G 2204/121; B60G 2800/162; B60G 2500/20; B60G 2200/326; B60G 2206/428; F16H 35/18; F16H 25/20; F16F 1/22; F16F 3/023; F16F 2228/066; B62D 21/02
USPC ...... 280/124.163, 124.165, 124.17, 124.171, 280/124.174
See application file for complete search history.

(56) References Cited

U.S. PATENT DOCUMENTS

| | | | | |
|---|---|---|---|---|
| 4,749,206 A * | 6/1988 | Delery | ............... | B60G 11/02 |
| | | | | 280/104 |
| 4,887,841 A | 12/1989 | Cowburn et al. | | |
| 5,016,861 A * | 5/1991 | Thompson | ............ | B60G 11/10 |
| | | | | 267/149 |
| 5,141,209 A * | 8/1992 | Sano | ................... | B60G 11/08 |
| | | | | 267/260 |
| 5,251,930 A * | 10/1993 | Kusaka | ................ | B60G 11/08 |
| | | | | 267/260 |
| 5,401,049 A * | 3/1995 | Richardson | ........... | B60G 5/043 |
| | | | | 280/124.134 |
| 6,189,904 B1 * | 2/2001 | Gentry | ................... | B60G 11/08 |
| | | | | 267/149 |
| 8,678,410 B2 * | 3/2014 | Sjoesten | ................ | B60G 11/08 |
| | | | | 280/124.17 |
| 8,936,265 B2 * | 1/2015 | Ehrlich | ................... | B60G 3/00 |
| | | | | 267/246 |
| 9,061,563 B2 * | 6/2015 | Girelli Consolaro | .. | B60G 11/08 |
| 9,278,596 B2 * | 3/2016 | Hummelt | .............. | B60G 11/08 |
| 2001/0048208 A1 * | 12/2001 | Stenvall | .................. | B60G 3/06 |
| | | | | 280/124.164 |
| 2006/0255556 A1 | 11/2006 | Reast | | |
| 2011/0291380 A1 | 12/2011 | Gerrard et al. | | |
| 2012/0098229 A1 * | 4/2012 | Hochapfel | ............ | B60G 11/08 |
| | | | | 280/124.134 |
| 2013/0145940 A1 * | 6/2013 | Roberge | ................ | A01F 15/10 |
| | | | | 100/100 |
| 2014/0008887 A1 | 1/2014 | Juriga | | |
| 2014/0014781 A1 * | 1/2014 | Hanlon | ............... | B64C 13/0421 |
| | | | | 244/234 |
| 2014/0131972 A1 | 5/2014 | Juriga | | |
| 2016/0207370 A1 * | 7/2016 | Moeller | ................. | B60G 11/08 |
| 2016/0243918 A1 * | 8/2016 | Spahl | ..................... | B60G 21/05 |

OTHER PUBLICATIONS

Written Opinion regarding related PCT App. No. PCT/US2016/032106; dated Aug. 24, 2016; 8 pgs.

* cited by examiner

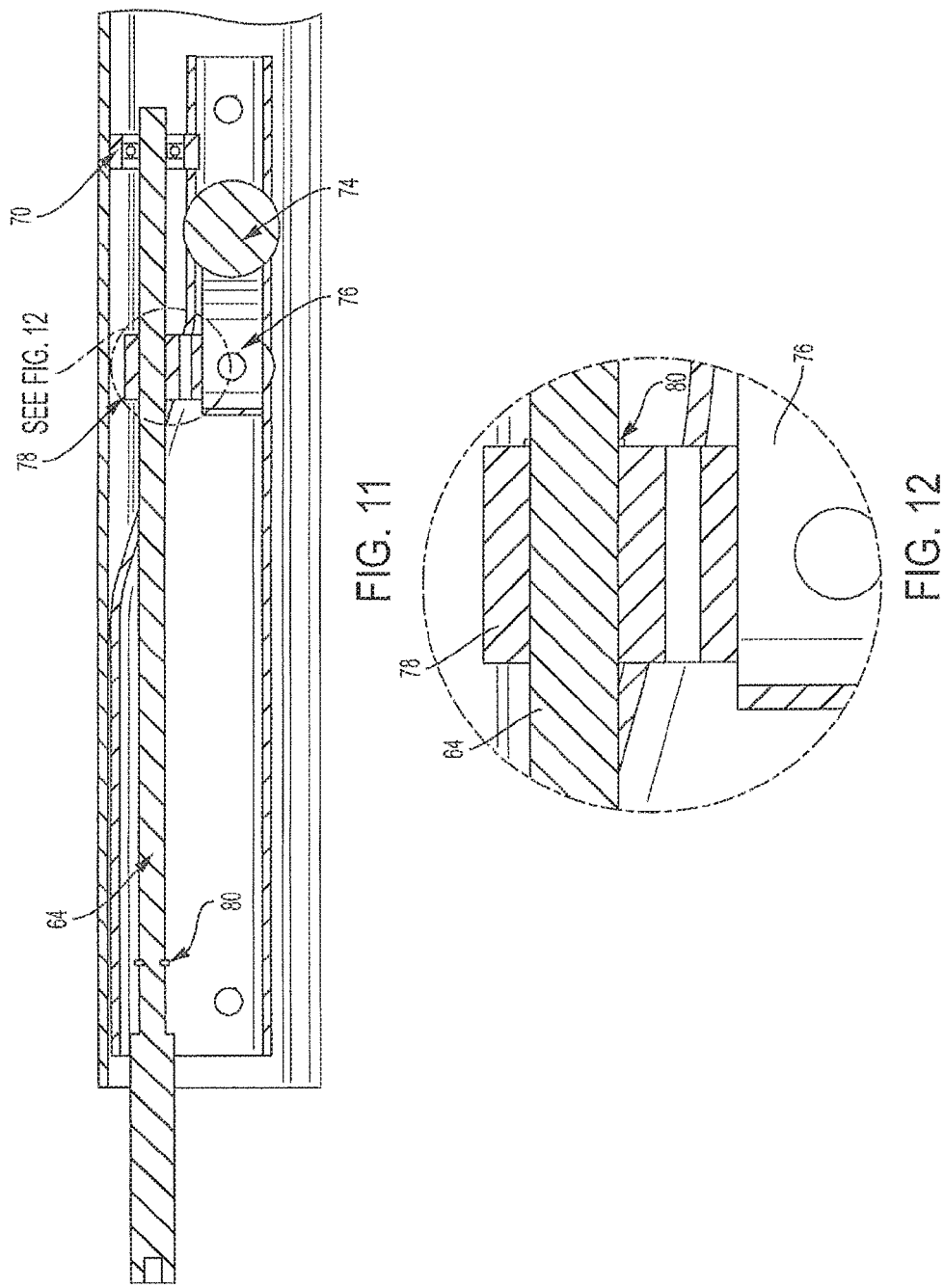

VARIABLE RATE FLAT SPRING ARRANGEMENT

CROSS-REFERENCE TO RELATED APPLICATIONS

This is a National Stage Application of PCT Publication No. PCT/US2016/032106 filed on May 12, 2016 which claims priority to U.S. Provisional Patent Application Ser. No. 62/161,511, filed May 14, 2015, both of which are incorporated herein by reference in their entirety.

FIELD OF THE INVENTION

This invention relates generally to variable rate flat spring arrangements.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive, the name of which derives from the French automobile firm of Hotchkiss, employs a solid axle that is coupled at its ends to the centers of respective semi-elliptical leaf springs. There are a number of problems with this form of drive arrangement. First, this drive system is characterized by high unsprung mass. Additionally, the use of a solid axle results in coupled left/right wheel motion. During heavy cornering and fast acceleration, this known system suffers from vertical deflection and wind-up.

One effort to address the problems associated with the Hotchkiss system employs a parallel leaf spring arrangement at each end of a solid axle. This known arrangement affords increased axle control, in the form of reduced power hop. Other advantages of this arrangement include roll under steer, auto load leveling and the gross vehicle weight, and no frame changes are required to convert from a Hotchkiss system. However, the parallel leaf spring arrangement employs a solid axle, and therefore does not provide the benefits of independent suspension. In addition, this arrangement is plagued with the disadvantage of high unsprung mass.

Accordingly, leaf spring suspension systems suffer from numerous drawbacks that may be improved upon.

SUMMARY OF THE INVENTION

According to one embodiment, a suspension system for a vehicle includes a first chassis rail extending longitudinally in an axial direction of the vehicle. Also included is a second chassis rail extending longitudinally in the axial direction of the vehicle. Further included is a first leaf spring element extending longitudinally in the axial direction of the vehicle, the first leaf spring element operatively coupled proximate ends thereof to the first chassis rail and at an intermediate location to an axle assembly of the vehicle. Yet further included is a second leaf spring element extending longitudinally in the axial direction of the vehicle, the second leaf spring element operatively coupled proximate ends thereof to the second chassis rail and at an intermediate location to the axle assembly of the vehicle. Also included is at least one leaf spring extending in a transverse direction of the vehicle, the at least one leaf spring having a spring rate that is variable.

According to another embodiment, a suspension system for a vehicle includes a first chassis rail extending longitudinally in an axial direction of the vehicle. Also included is a second chassis rail extending longitudinally in the axial direction of the vehicle. Further included is a first spring element operatively coupled to the first chassis rail and to an axle assembly of the vehicle. Yet further included is a second spring element operatively coupled the second chassis rail and to the axle assembly of the vehicle. Also included is at least one leaf spring extending between the first chassis rail and the second chassis rail, the at least one leaf spring having a spring rate that is actively variable.

According to yet another embodiment, a variable rate spring arrangement includes a flat spring extending from a first end to a second end. Also included is a fulcrum adaptor operatively coupled to the flat spring and configured to modify an effective length of the spring to adjust the overall stiffness of the spring.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 11 is a cross-sectional view of the fulcrum locator taken along line A-A of FIG. 10; and FIG. 12 is an enlarged view of a roller assembly of the fulcrum locator.

DETAILED DESCRIPTION

Figure 1:
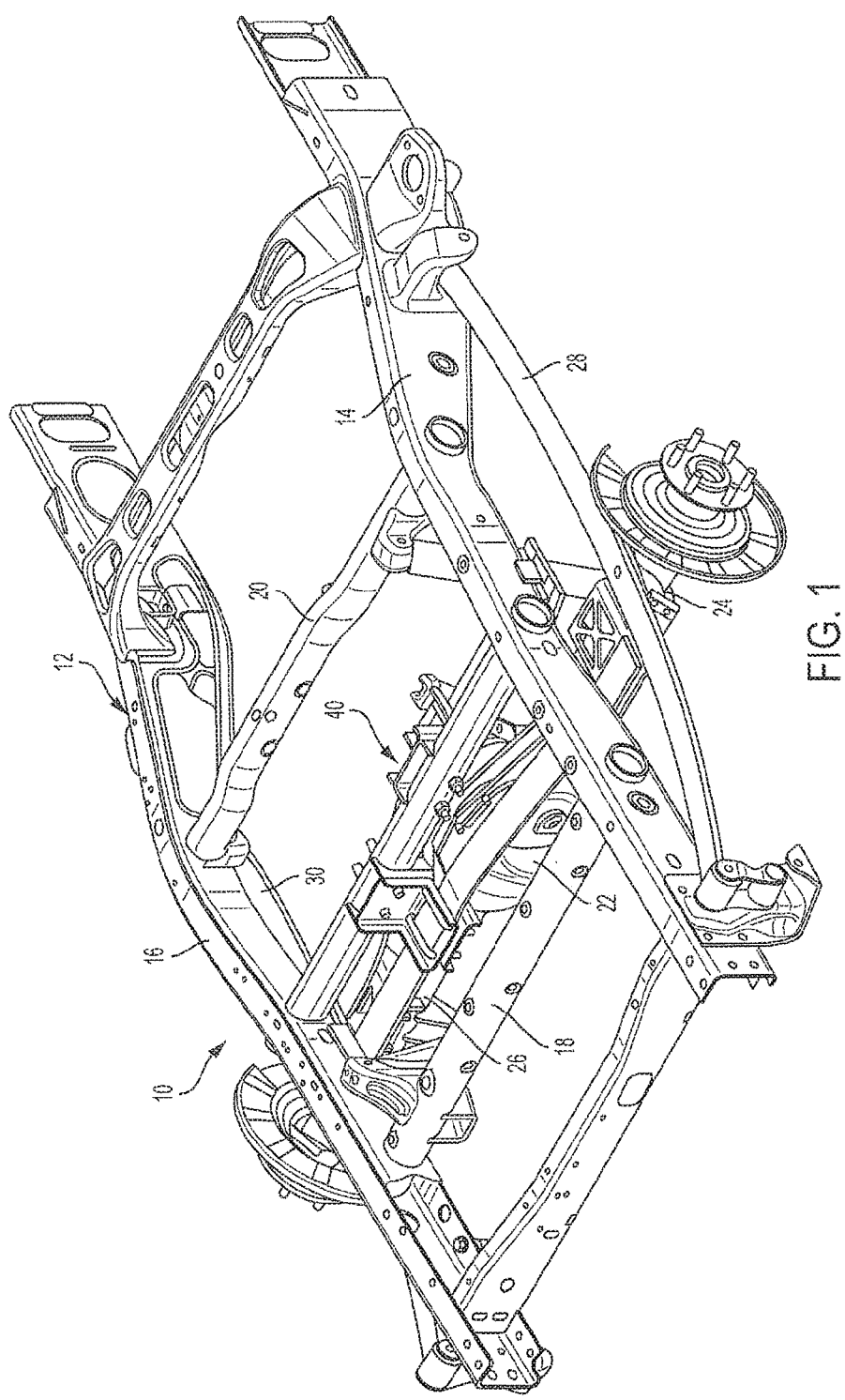
FIG. 1 is a perspective view of a vehicle suspension system having a transverse spring arrangement according to one aspect.

Referring to FIG. 1, illustrated is a vehicle suspension system 10 having a chassis generally designated with numeral 12. The chassis 12 includes a first chassis rail 14 and a second chassis rail 16 that are arranged substantially parallel to each other. The first and second chassis rails 14, 16 are coupled to each another by at least one cross brace, such as a first cross brace 18 and a second cross brace 20, as shown. A differential drive arrangement 22 is fixedly coupled to the chassis 12 and converts the rotary motion of a drive shaft (not shown) to substantially orthogonal rotary motion at half shafts 24 and 26. Each of the half shafts 24, 26 include an associated pair of universal joints (not specifically designated) that are arranged to be proximal and distal with respect to the differential drive arrangement 22. Thus, the half shafts 24, 26, each of which has an associated longitudinal axis, accommodate transaxial motion.

Half shafts 24, 26 are shown to be coupled at their distal ends to respective leaf springs 28 and 30. Referring to leaf spring 28, for example, the leaf spring is, in this specific illustrative embodiment of the invention, operatively coupled proximate its ends to the chassis 12. It is to be appreciated that multiple leaf springs may be disposed in a stacked arrangement. Additionally, although not illustrated, in some embodiments, a half leaf spring may be included and may be operatively coupled to the chassis 12 proximate a first end of the half leaf spring and to one of the half shafts 24, 26 proximate a second end of the half leaf spring. In such embodiments, the half leaf spring(s) is located in a spaced manner from the leaf springs 28, 30, and may be located above or below the leaf springs 28, 30.

Figure 2:
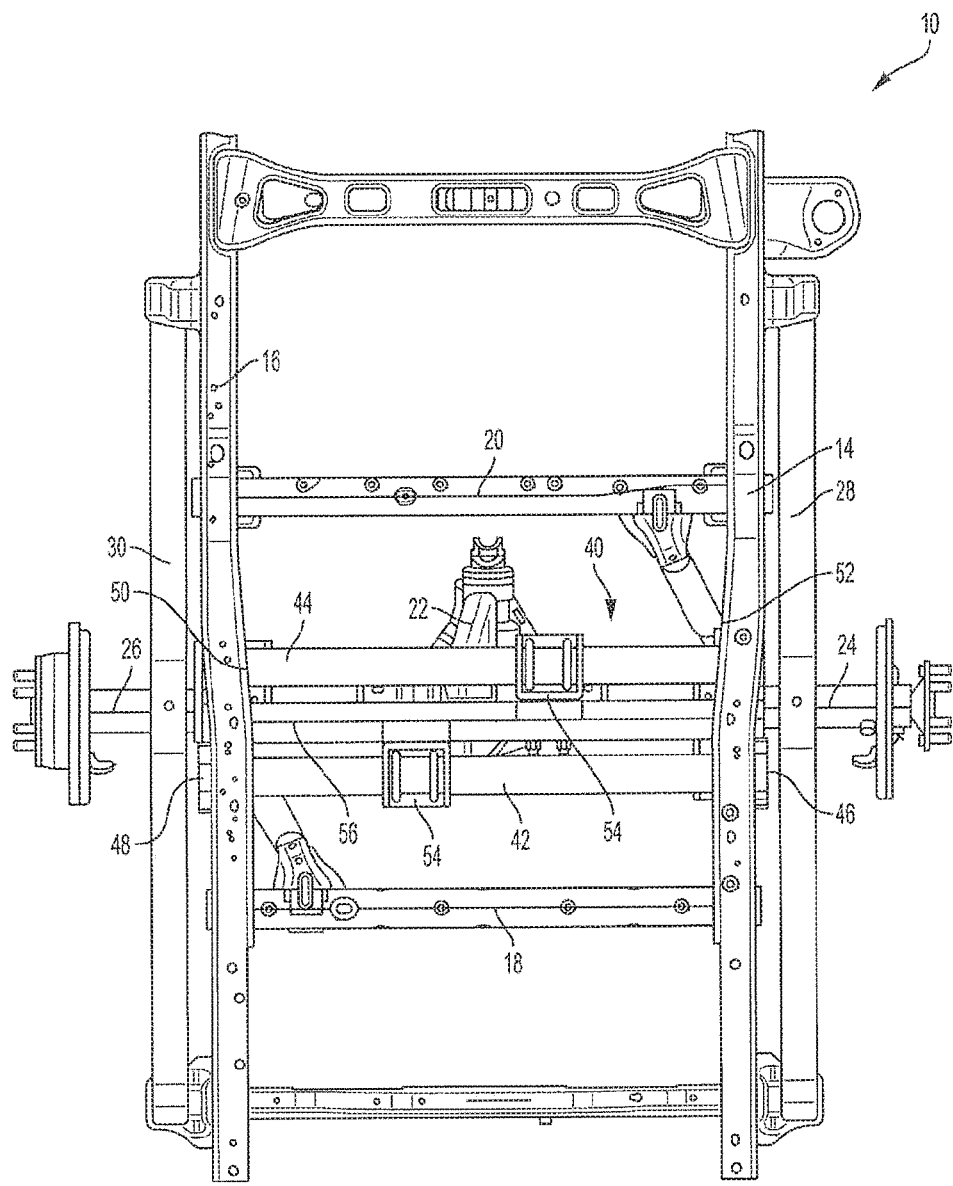
FIG. 2 is a plan view of the vehicle suspension system of FIG. 1.
Figure 3:
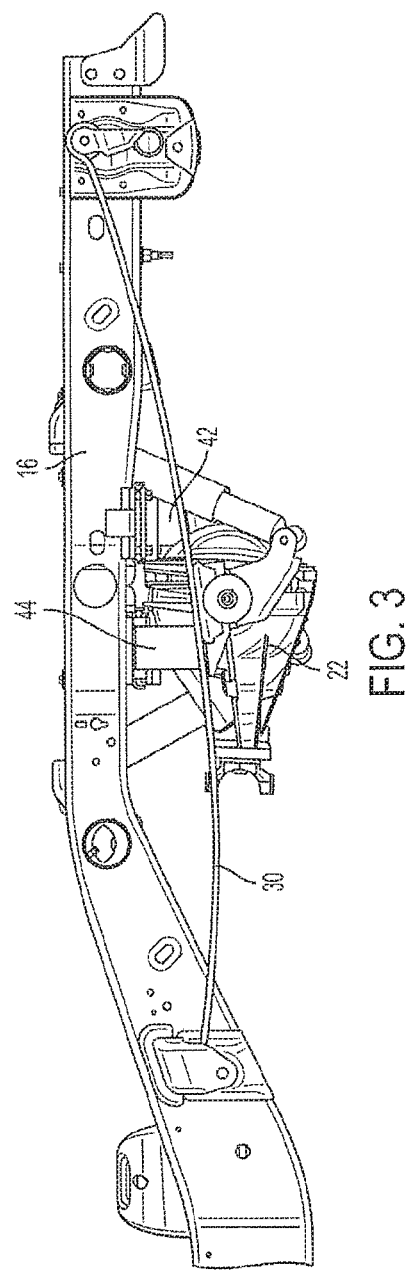
FIG. 3 is a side view of the vehicle suspension system of FIG. 1.

Referring now to FIGS. 2 and 3, with continued reference to FIG. 1, the vehicle suspension system 10 also includes a transverse spring arrangement 40. As will be appreciated from the description herein, the transverse spring arrangement 40 provides active, or variable, spring rate change to work with the above-described leaf springs 28, 30 to advantageously adapt to different loads applied to the vehicle suspension system 10, achieve ride targets and improve vehicle dynamics Typically, a leaf spring suspension system has predetermined characteristics that are intended to accommodate certain loads, but vehicles may be subjected to different loads and the active spring rate change capability of the vehicle suspension system 10 described herein allows a user to modify the spring characteristics of the transverse spring arrangement 40 to adapt to the specific load that the vehicle is subjected to. Therefore, the vehicle is leveled to maintain a desired ride height by varying the spring rate.

Figure 6:
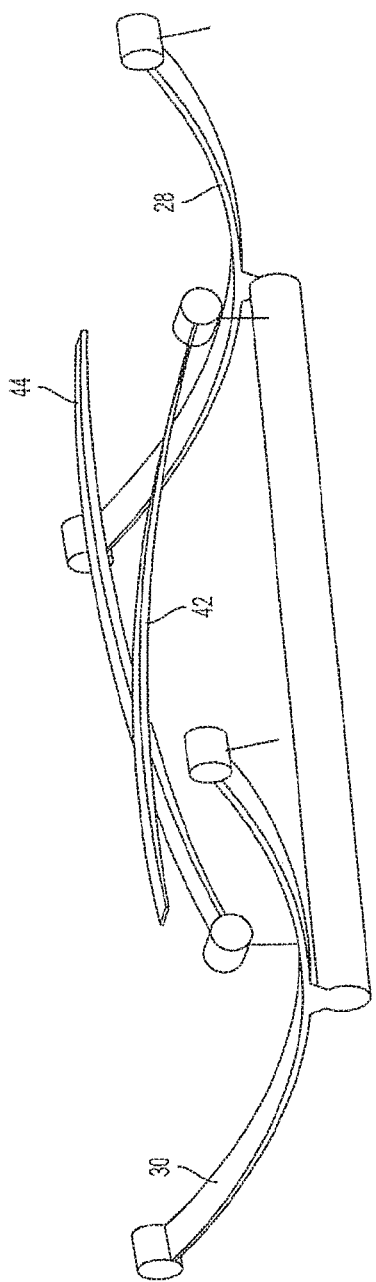
FIG. 6 is a perspective view partially illustrating the transverse leaf spring arrangement.

The transverse spring arrangement 40 includes at least one spring that extends in a cross-car direction and substantially orthogonal to the leaf springs 28, 30. As noted, a single spring may be included, but a plurality of springs may be provided in some embodiments, such as the illustrated embodiment. In the illustrated embodiment, a first spring 42 and a second spring 44 are included. The first spring 42 is operatively coupled to the half shaft 24 proximate a first end 46 of the first spring 42 and operatively coupled to the second chassis rail 16 proximate a second end 48 of the first spring 42. The second spring 44 is operatively coupled to the half shaft 26 proximate a first end 50 of the second spring 44 and operatively coupled to the first chassis rail 14 proximate a second end 52 of the second spring 44. The aforementioned coupling arrangement of the first and second springs 42, 44 thereby couples the half-shafts (e.g., axles) to the chassis 12. As shown in FIG. 6, the ends of the springs 42, 44 that are operatively coupled to the chassis 12 include shackles to reduce or prevent side-to-side shifting of the vehicle during operation, particularly during turning maneuvers.

The above-described springs, e.g., leaf springs 28, 30 and the first and second springs 42, 44 may be referred to as "semi-elliptical" springs configured as arc-shaped length segments. In some embodiments, the springs are formed of spring steel having a substantially rectangular cross-section. In other embodiments, a composite material may be used. However, alternative materials and geometries are contemplated.

To achieve the active rate control of the above-described first and second springs 42, 44, a fulcrum location of each of the springs 42, 44 is modified with a fulcrum adaptor 54. For purposes of discussion, only modification of the fulcrum location of the first spring 42 will be described in detail, but it is to be understood that both springs are associated with a respective fulcrum adaptor. In the illustrated embodiment, the fulcrum adaptor 54 comprises a clamping arrangement 54 that is operatively coupled to a transverse beam 56 that extends in a cross-car direction and is fixed to the first chassis rail 14 and the second chassis rail 16 proximate respective ends of the transverse beam 56. The clamping arrangement 54 clamps the first spring 42 to maintain the fulcrum location at the clamped location. The clamping arrangement 54 is coupled to both the transverse beam 56 and the first spring 42 in a manner that allows the clamping arrangement 54 to slide relative to these components. The sliding relationship facilitates modification of the fulcrum location to adjust the spring rate characteristic. This impacts the overall suspension dynamics and ride characteristics, as well as provides the desired extent of leveling of the vehicle during a currently applied load.

Figure 4:
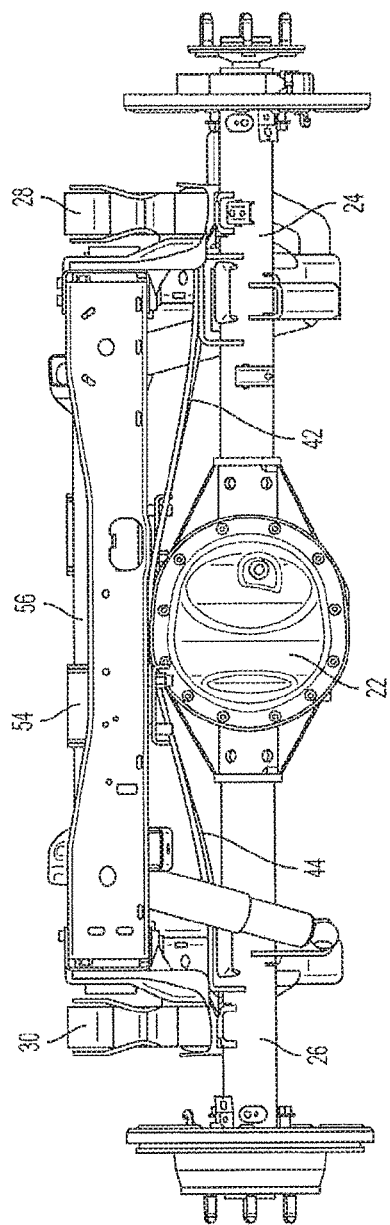
FIG. 4 is a front elevational view of the vehicle suspension system of FIG. 1 with the transverse spring arrangement in a first position.
Figure 5:
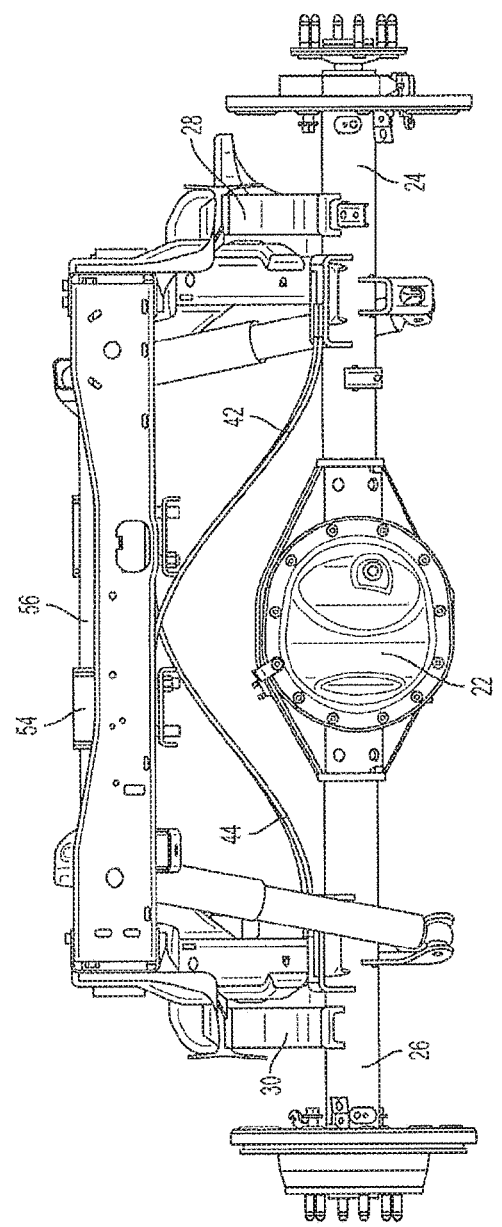
FIG. 5 is a front elevational view of the vehicle suspension system of FIG. 1 with the transverse spring arrangement in a second position.

Referring to FIGS. 4 and 5, the vehicle suspension system 10 is illustrated in distinct positions. In particular, FIG. 4 shows the system 10 and, more particularly, the transverse spring arrangement 40 in a first position, while FIG. 5 illustrates the springs of the transverse spring arrangement 40 in a second position. As discussed above, the actively controlled characteristics (e.g., spring rate) of the springs 42, 44 of the transverse spring arrangement 40 vary the response characteristics of the overall vehicle suspension system 10.

Referring now to FIGS. 7-12, another embodiment of the vehicle suspension system 10 is illustrated. The illustrated embodiment includes another embodiment of the fulcrum adaptor 54 that is configured to actively modify the spring rate of the first and second springs 42, 44. The fulcrum adaptor 54 comprises a roller assembly 60 that is displaced along the first and second springs 42, 44 via a linear screw actuation assembly 62.

Figure 7:
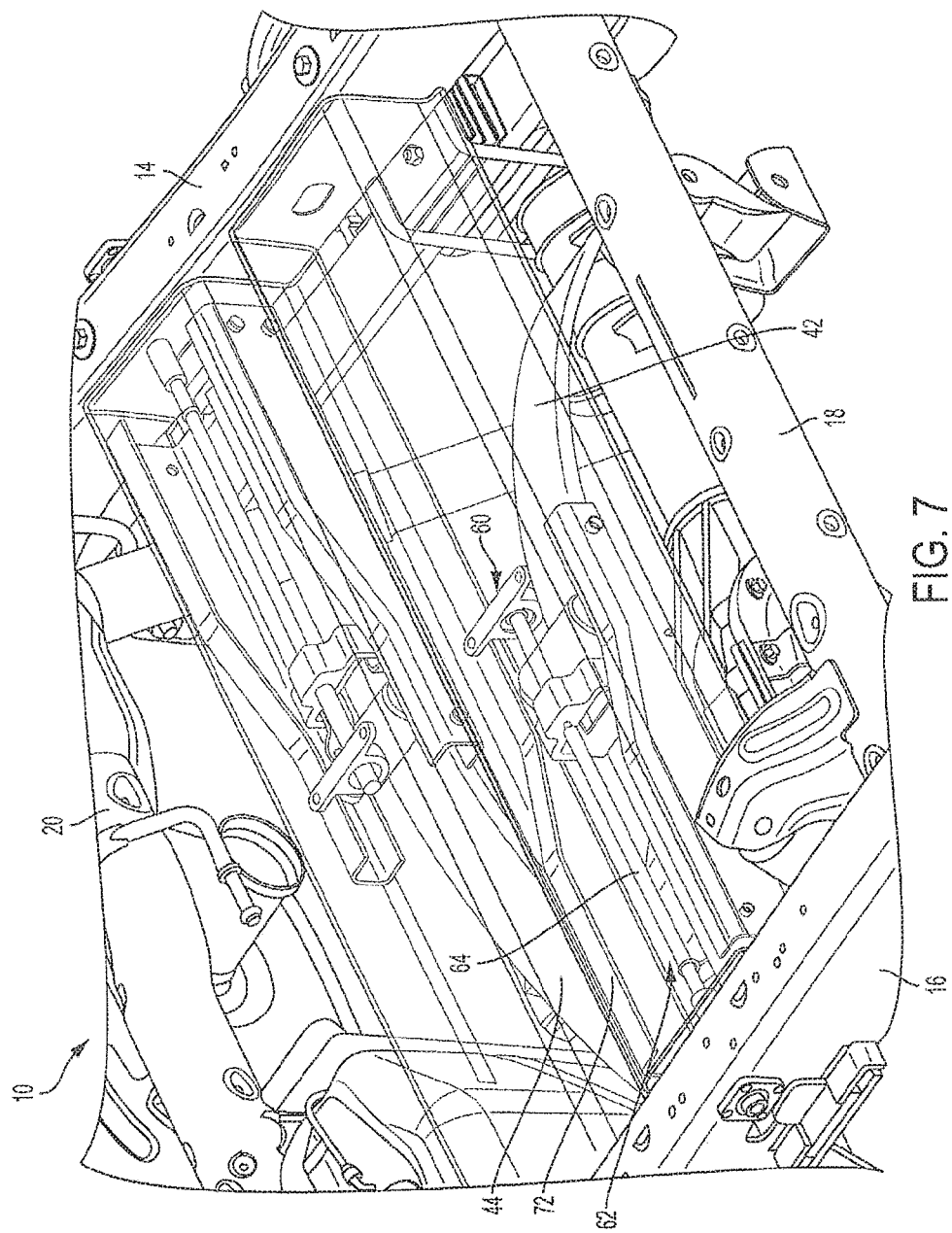
FIG. 7 is a perspective view of the vehicle suspension system having a transverse spring arrangement according to another aspect of the invention.
Figure 8:
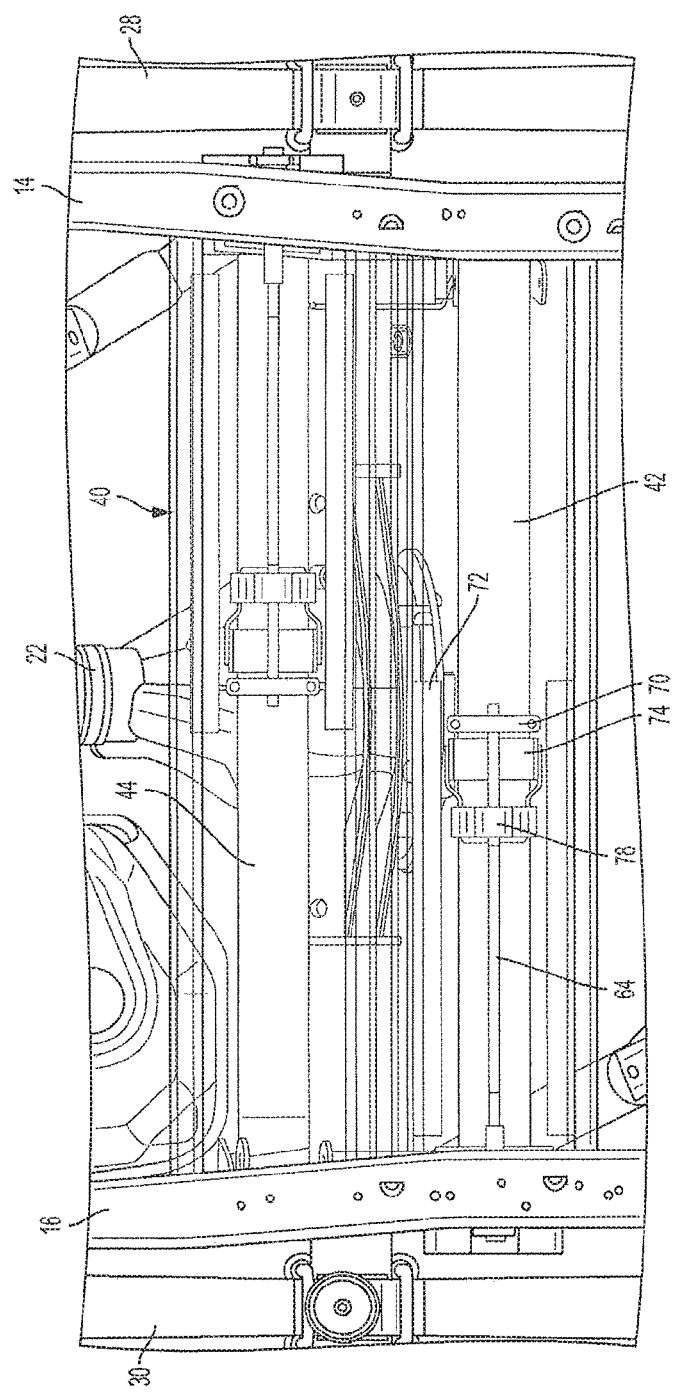
FIG. 8 is a plan view of the vehicle suspension system of FIG. 7.
Figure 9:
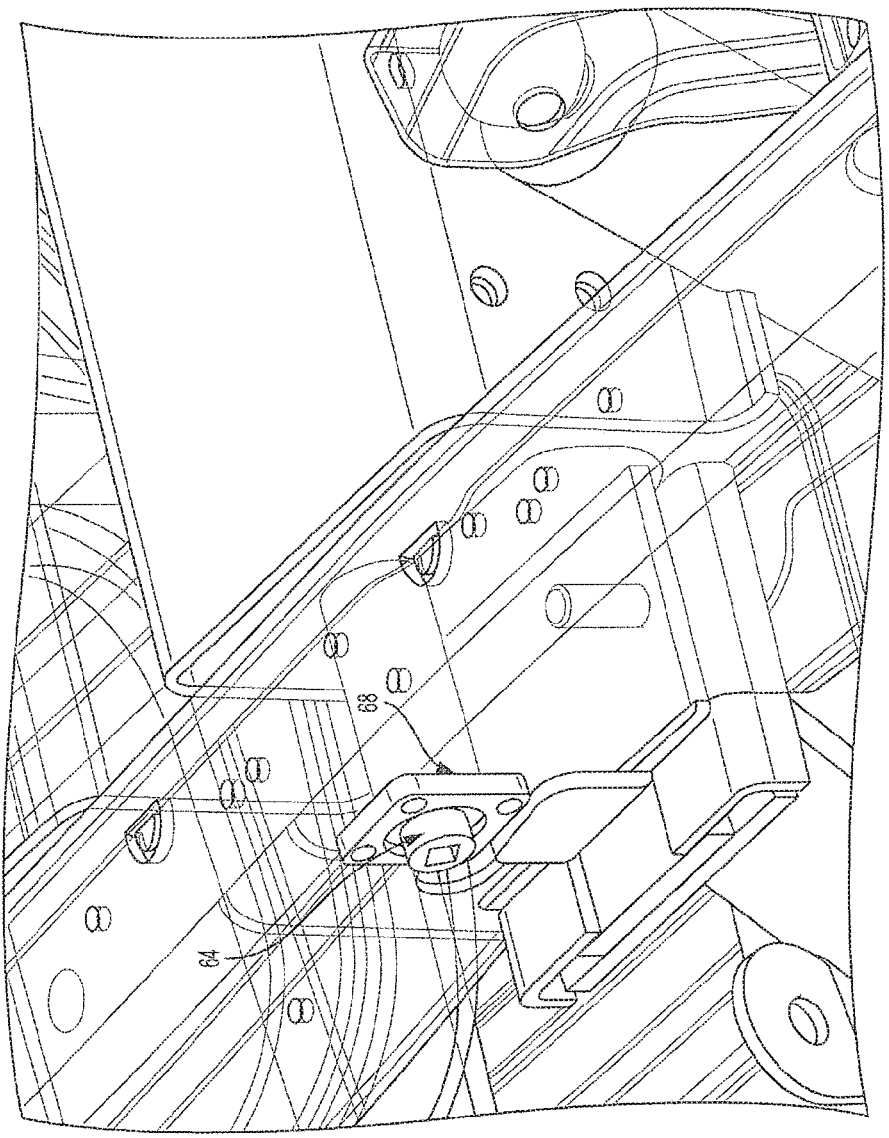
FIG. 9 is a perspective view of an end of the transverse spring arrangement of FIG. 7.
Figure 10:
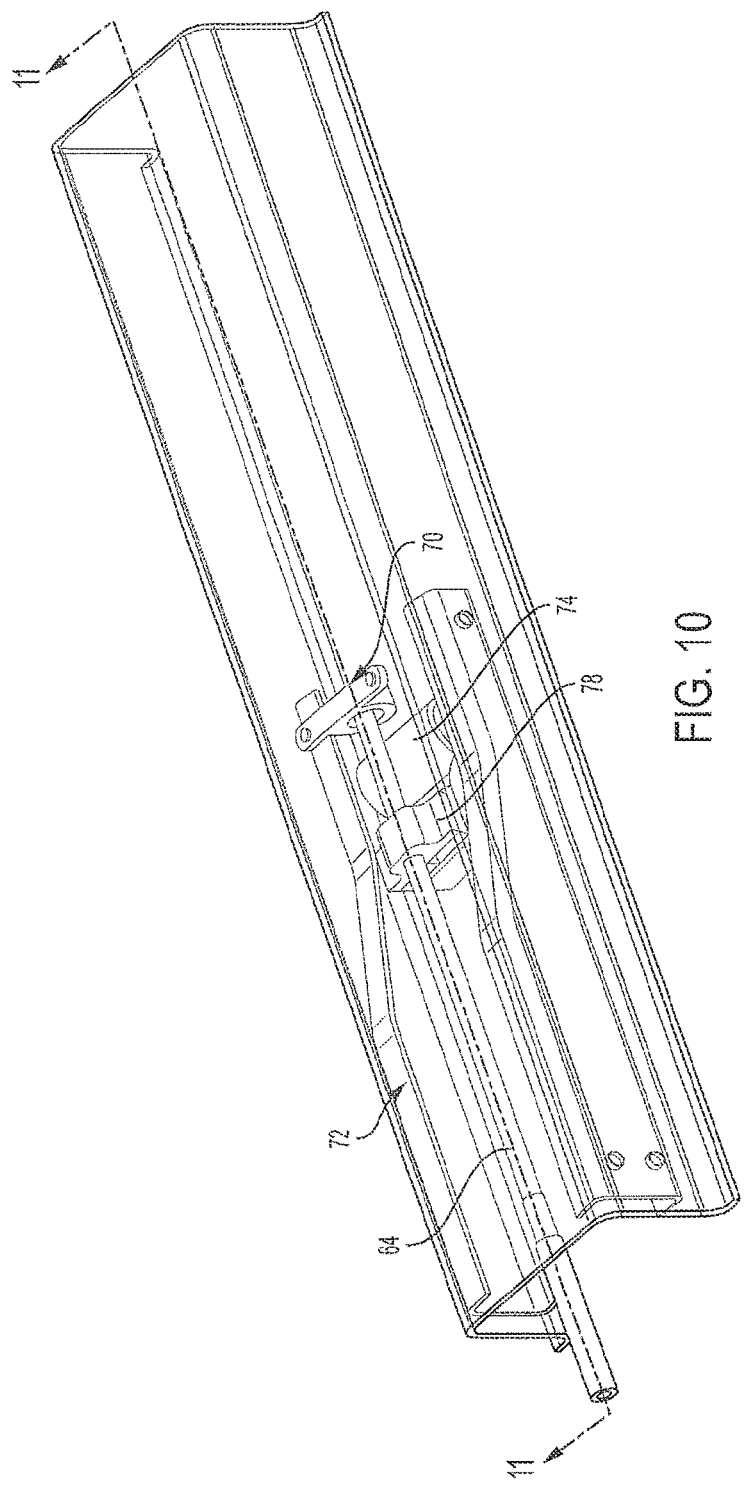
FIG. 10 is a perspective view of a fulcrum locator of the transverse spring arrangement of FIG. 7.

The linear screw actuation assembly 62 is fixed to the chassis 12 at a respective chassis rail, as best shown in FIGS. 7 and 9. A threaded shaft 64 extends in a transverse direction and through the chassis rail into a drive socket 68 that is coupled to the chassis rail. At an opposing end of the threaded shaft 64, coupling is made to a bearing 70 that is coupled to a cross member 72. It is to be appreciated that the bearing associated with the first and second springs 42, 44 are coupled to a single cross member or to respective cross members.

The roller assembly 60 includes at least one roller 74 directly in contact with the springs 42, 44 and is coupled to a roller bracket 76. The roller bracket 76 is coupled to a threaded slider block 78 that is directly coupled to the threaded shaft 64, thereby indirectly coupling the roller 74 to the threaded shaft 64 for movement therealong. One or more stopping features, such as a retaining clip 80 may be positioned on the threaded shaft 64 to retain the roller assembly within a desired boundary along the length of the threaded shaft 64.

Regardless of the precise type of fulcrum adaptor 54 employed, the adaptor may be controlled either manually or in an automated manner. For example, manual control of the transverse spring arrangement 40 may be carried out by a hand crank that is coupled to an input of the arrangement. Automated control of the fulcrum adaptor 54 may be made with a control system that is located onboard the vehicle in some embodiments and remotely in other embodiments. Remote control may be done with a wireless device, for example.

The embodiments described herein define active rate control of a spring or beam. This may be referred to as "active rate beam theory," which facilitates controlling system dynamics in an advantageous manner. As described above, this is done by manipulating the fulcrum location to alter the moment applied to the beam or spring. Although described above in terms of a transverse spring arrangement, it is to be understood that active rate beam theory may be applied to differently oriented spring arrangements. For example, the fulcrum adaptor 54 may be operatively coupled to a longitudinally extending spring, such as leaf spring 28 or 30, or to a longitudinally extending spring located above or below leaf spring 28 and/or 30. Additionally, the fulcrum adaptor 54 may be operatively coupled to a spring that is part of a triangulated arrangement and that extends in a diagonal manner. Therefore, the fulcrum adaptor 54 may be applied to a longitudinally extending spring arrangement, a transverse spring arrangement, and/or to a spring arrangement that is oriented at any diagonal angle relative to the transverse and longitudinal directions. The active rate beam theory may be applied to a single spring arrangement or any combination of the above-specified arrangements.

The embodiments described herein may be employed in any type of suspension arrangement. For example, a control arm suspension may benefit from the active rate control described herein. In such an embodiment, an upper and/or lower arm may benefit from active rate control, such as a transverse configuration of the upper and/or lower arm. Also, a rear twist axle may benefit from the embodiments described herein.

It is to be appreciated that the features and advantages of "active rate beam theory," as described above, may be applied to any spring arrangement, particularly flat spring arrangements. Therefore, the features related to controlling the spring characteristics (e.g., stiffness) by manipulating an effective length of the spring may be applied to any vehicle or non-vehicle application having a spring arrangement.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

The invention claimed is:

1. A suspension system for a vehicle, the suspension system comprising:
    a first chassis rail extending longitudinally in an axial direction of the vehicle;
    a second chassis rail extending longitudinally in the axial direction of the vehicle;
    a first leaf spring element extending longitudinally in the axial direction of the vehicle, the first leaf spring element operatively coupled proximate ends thereof to the first chassis rail and at an intermediate location to an axle assembly of the vehicle;
    a second leaf spring element extending longitudinally in the axial direction of the vehicle, the second leaf spring element operatively coupled proximate ends thereof to the second chassis rail and at an intermediate location to the axle assembly of the vehicle;
    at least one leaf spring extending in a transverse direction of the vehicle, the at least one leaf spring having a spring rate that is actively variable, wherein the spring rate of the at least one leaf spring is actively variable with a fulcrum locator operatively coupled to the at least one leaf spring and in a sliding relationship with the at least leaf one spring, wherein the fulcrum locator comprises a roller assembly driven by a linear screw actuator.

2. The suspension system of claim 1, wherein the at least one leaf spring is operatively coupled to the chassis rail and to the axle.

3. The suspension system of claim 1, wherein the at least one leaf spring comprises a first transverse leaf spring and a second transverse leaf spring.

4. A suspension system for a vehicle, the suspension system comprising:
    a first chassis rail extending longitudinally in an axial direction of the vehicle;
    a second chassis rail extending longitudinally in the axial direction of the vehicle;
    a first spring element operatively coupled to the first chassis rail and to an axle assembly of the vehicle;
    a second spring element operatively coupled the second chassis rail and to the axle assembly of the vehicle;
    at least one leaf spring extending between the first chassis rail and the second chassis rail, the at least one leaf spring having a spring rate that is actively variable, wherein the spring rate of the at least one leaf spring is actively variable with a fulcrum locator operatively coupled to the at least one leaf spring and in a sliding relationship with the at least leaf one spring, wherein the fulcrum locator comprises a roller assembly driven by a linear screw actuator.

5. The suspension system of claim 4, wherein the at least one leaf spring comprises a first transverse leaf spring and a second transverse leaf spring.

6. A variable rate spring arrangement comprising:
    a flat spring extending from a first end to a second end; and
    a fulcrum adaptor operatively coupled to the flat spring and configured to modify an effective length of the spring to adjust the overall stiffness of the spring, wherein the fulcrum adaptor comprises a roller assembly driven by a linear screw actuator.

7. The suspension system of claim 6, wherein the fulcrum adaptor is operatively coupled to the flat spring and slidable relative thereto.

* * * * *